Figure 1:
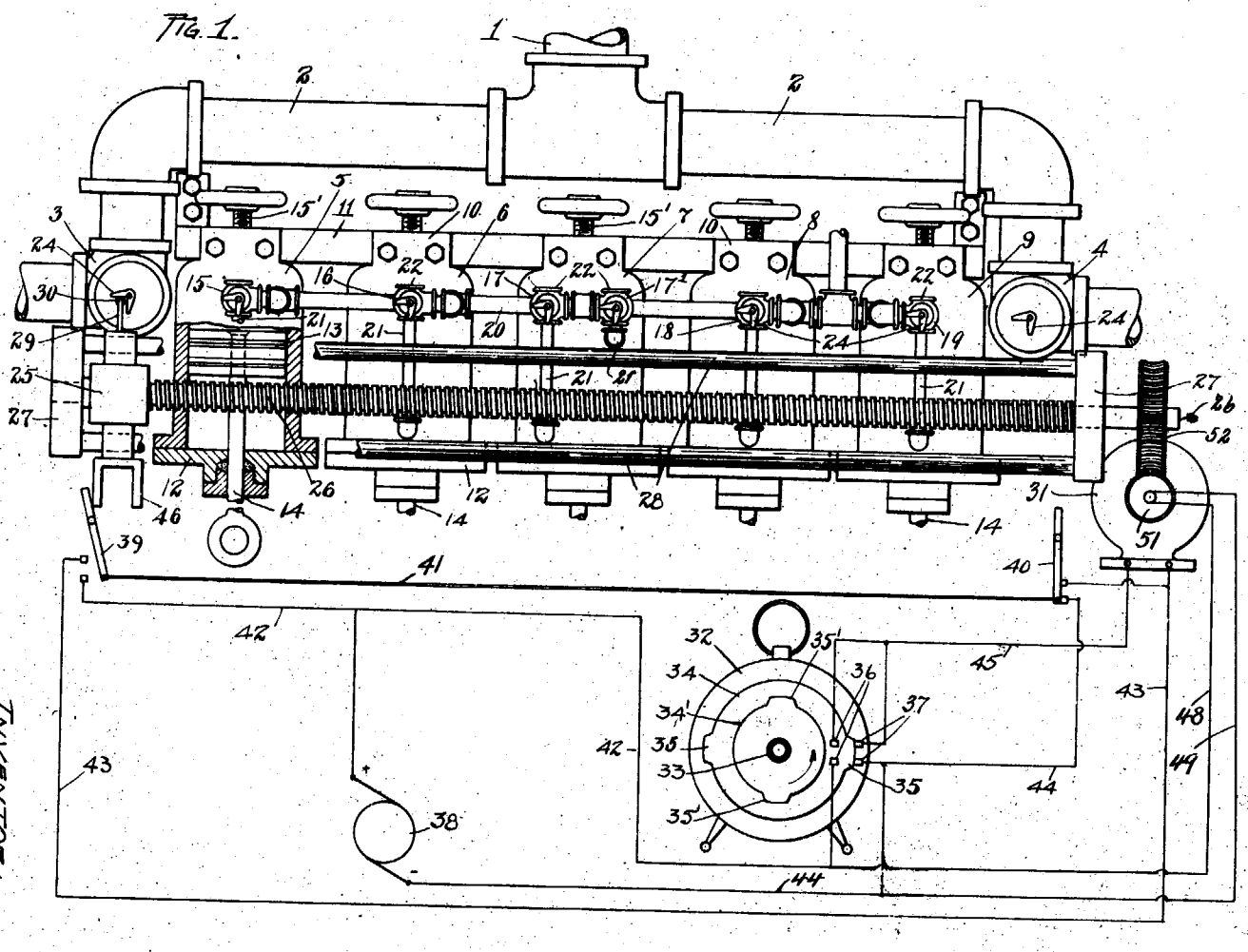

J. HORN

AUTOMATIC REVERSER.

APPLICATION FILED OCT. 5, 1918.

Reissued Mar. 9, 1920.

14,815.

2 SHEETS—SHEET 1.

INVENTOR
John Horn,
BY Bakewell & Macklin,
ATTORNEYS.

J. HORN

AUTOMATIC REVERSER.

APPLICATION FILED OCT. 5, 1918.

Reissued Mar. 9, 1920.

14,815.

2 SHEETS—SHEET 2.

INVENTOR
John Horn,
By Baker & Macklin
ATTORNEYS.

UNITED STATES PATENT OFFICE.

JOHN HORN, OF CLEVELAND, OHIO.

AUTOMATIC REVERSER.

14,815. Specification of Reissued Letters Patent. Reissued Mar. 9, 1920.

Original No. 1,257,352, dated February 26, 1918, Serial No. 170,910, filed May 25, 1917. Application for reissue filed October 5, 1918. Serial No. 257,384.

*To all whom it may concern:*

Be it known that I, JOHN HORN, a citizen of the United States, residing at Cleveland, in the county of Cuyahoga and State of Ohio, have invented a certain new and useful Improvement in Automatic Reversers, of which the following is a full, clear, and exact description, reference being had to the accompanying drawings.

The present invention relates to mechanism for periodically and automatically reversing a series of controlling devices, thus obviating the necessity of hand control and overcoming the irregularities and uncertainties due to manual operation.

Though not limited to the kind of structure referred to, the mechanism is well adapted for controlling a regenerative furnace or similar structure, wherein mechanism automatically and intermittently reverses air and fuel valves without relying on the memory and activity of a human operator.

Open hearth furnaces, melting furnaces, brick kilns and the like frequently require the reversal of fuel or air supplied and the position of stack or flue valves. This has ordinarily been done manually. For instance, in the operation of open hearth furnaces, it has been the custom for the attendant to reverse the valves about every fifteen minutes, but this interferes with the attention of the operator to the other operations of the furnace, and, furthermore, it relies on his watchfulness and memory in effecting the reversals at the proper time. There have been many instances where the attendant damaged the material being produced or seriously injured the furnace by delaying or forgetting to make the reversals at the proper time.

I have overcome the difficulties mentioned and have introduced a regularity not attainable by hand operation, by providing a series of actuators, each having a controlling device; a traveling member adapted to engage the successive controlling devices, and a time controlled device governing the movement of the traveler. If it be desired to operate the various devices by fluid pressure pistons and cylinders, the actuators may readily move the valves to properly direct the pressure fluid. Such an embodiment of the invention, as well as the more generic combination of coöperating elements above referred to, is comprehended within the invention herein claimed. Accordingly the invention may be best summarized as comprising the combination of coöperating elements for producing a novel result, as well as the combination and arrangement of parts illustrated in the drawings and hereinafter more fully explained. The essential characteristics of my invention are summarized in the appended claims.

Figure 2:
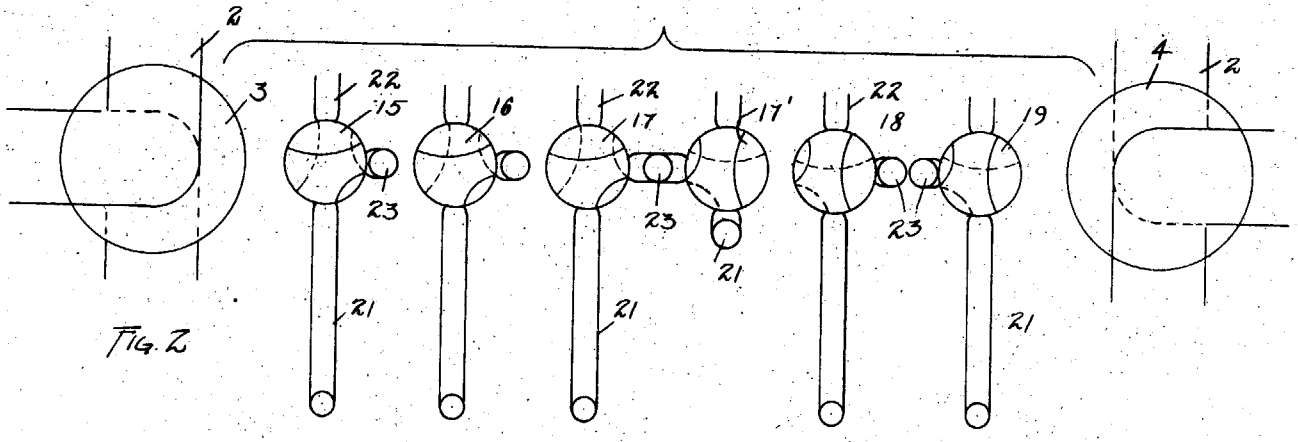
Figure 4:
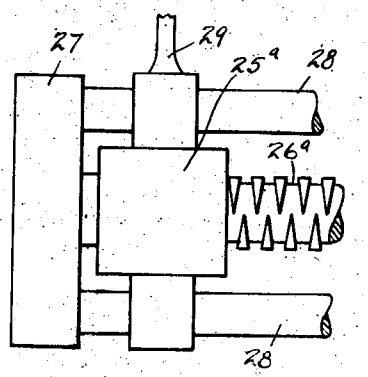
Figure 3:
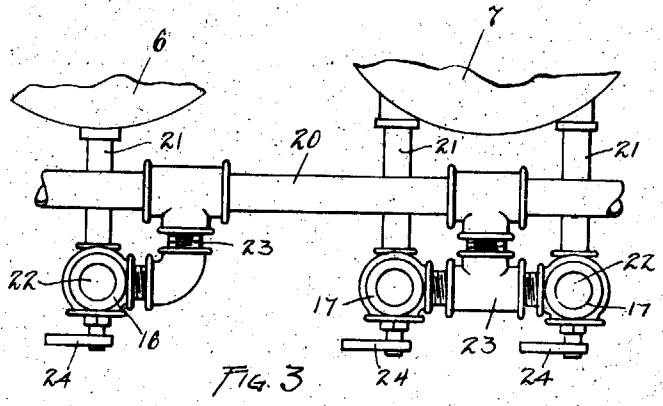

The drawings illustrate my invention embodied in a structure wherein the actuators control fluid pressure cylinders. Figure 1 is a front elevation of such embodiment, portions being broken away and the electrical part of the apparatus being illustrated diagrammatically; Fig. 2 is a diagrammatic view illustrating valves which the actuators may operate; Fig. 3 is a fragmentary plan, illustrating some of the fluid pressure valves; Fig. 4 is a fragmentary detail illustrating a modification of the means for reciprocating the traveler.

In the drawings, the numeral 1 designates a fuel supply pipe through which gas, oil or other fuel is supplied to branch pipes leading to the opposite ends of the furnace, kiln, or the like. The branch pipes 2 are alternately opened and closed by means of suitable valves 3 and 4, one valve being closed while the other is open, and the valves being reversed at intervals, to change the supply of fuel from one end of the furnace to the other.

Between the valves 3 and 4 is a horizontal row of vertical cylinders 5, 6, 7, 8 and 9, it being understood that any suitable number of these cylinders can be used, according to the circumstances. The upper ends of said cylinders have portions 10 bolted or otherwise fastened to a horizontal supporting bar, or frame, 11 and the lower ends of said cylinders have heads 12. Pistons 13 are slidable vertically within the cylinders and have depending piston rods 14 extending through the heads 12. The piston rods 14 of the cylinders 5 and 6 can be connected to the air valves at one end of the furnace, and the piston rods of the cylinders 8 and 9 can be connected to the air valves at the other end of the furnace, while the piston rod of the cylinder 7 can be connected to the flue or stack valves. The piston rods are connected by any suitable operative connections with the valves or devices, and since the present invention does not concern said connections or the common valves or devices to which the piston rods are connected, they need not be illustrated or described in detail. Stop screws 15′ are threaded downwardly through the upper ends of the cylinders and are adjustable to limit the upward movement of the pistons.

Three way fluid pressure or compressed air valves 15, 16, 17, 17′, 18 and 19 are provided for the respective cylinders 5, 6, 7, 8 and 9, said valves being of similar construction. They are disposed in front of a horizontal fluid pressure supply pipe 20 which is in turn in front of the cylinders. The pipe 20 has branches connected to said valves, and each valve is connected by a pipe 21 with the respective cylinder, each valve also having an exhaust port 22 opening into the atmosphere. The pipes 21 of the valves 15, 16, 17, 18 and 19 are connected to the lower portions of the respective cylinders 5, 6, 7, 8 and 9, while the pipe 21′ of the valve 17′ is connected to the upper portion of the intermediate cylinder 7. This cylinder 7 has the two valves 17 and 17′, whereby the piston of this cylinder is moved by fluid pressure in both directions, while the pistons of the cylinders 5, 6, 8 and 9 are simply raised by fluid pressure, and moved downwardly by gravity, assisted by the movement of the devices to which the piston rods are connected.

It is to be understood that when the fluid pressure cylinder operating devices are employed, the connections from the pistons may be made in any manner desired. The pistons may be single acting (operating in one direction by pressure and in the other by gravity) as in the case of the cylinders 5, 6, 8 and 9, or the device may be double acting as in the case of the cylinder 7.

24 in Fig. 1 illustrates a series of actuators arranged in a horizontal row. In case the fluid pressure embodiment shown is employed, each actuator is on the stem of a fluid controlling valve as 3, 15, 16, 17, 17′, 18, 19 and 4. The members 24 accordingly close and open these valves as desired, each valve remaining in its given position until it is altered by the subsequent movement of its actuator.

A nut 25 travels upon a horizontal screw 26, arranged parallel with the series of actuators and journaled in suitable bearings 27, and has a tappet member 29 which is preferably provided with a roller 30 for engaging the members 24, the roller 30 being movable into the jaw of the respective members and after turning that member moving on out of engagement therewith and into engagement with the next member. The nut is caused to reciprocate back and forth by the rotation of the screw. If the thread of the screw extends only in one direction, the direction of its rotation is periodically reversed to reverse the direction of travel of the nut. If the screw is of the right and left hand variety, as shown in Fig. 4, a continuous rotation of the screw in one direction causes a reciprocation of a suitable nut, as is well understood.

Suitable means is provided for rotating the screw, as, for example, an electric motor 31. This motor is shown in Fig. 1 as geared by a worm 51 and worm wheel 52 with the screw shaft. The motor is automatically stopped at the end of each stroke of the traveling nut by switching mechanism operated by the nut, as hereinafter described; it is restarted after a suitable interval of time by any suitable time controlled mechanism.

When the single thread screw of Fig. 1 is employed the motor is made reversible and rotates in opposite directions after each stopping, the mechanism switched by the nut not only opening the circuit but setting it for reverse reconnection by the time controlled device. In the embodiment shown in Fig. 4, the motor will always revolve in one direction and is simply periodically stopped for the desired length of time.

While some time controlled device acting periodically at predetermined intervals, is an important feature the invention is independent of the particular form of time controlled mechanism employed. Any suitable device may be employed for this purpose which is operative to restart the movement of the traveler after a predetermined period of rest at each end of the stroke.

In Fig. 1, I have shown the timing device as clock mechanism 32 which may be associated with an ordinary clock. 33 indicates a suitable arbor rotated by the clock work which may have a revolution once every hour or can be geared at any other desired speed. Mounted on this arbor are shown metal disks 34 and 34′ insulated from each other and each having diametrically opposed projections 35—35 and 35′—35′, the projections on one disk being shown as spaced a quarter turn from those on the other. This provides very readily for actuation of the motor every fifteen minutes if the arbor 33 makes one rotation per hour. The projections 35—35 on the disk 34 in the embodiment shown operate to bridge a pair of contacts 37 and provide a circuit for the travel of the nut toward the left, while the contacts 35′ and 35′ on the disk 34′ contact with the terminals 36 and provide for movement of the traveler toward the right. Electric current is supplied from any suitable source as indicated by the generator 38.

The automatic stopping device for the motor at each end of the stroke is shown as consisting of the electric switches 39 and 40 arranged to be engaged and operated by the nut when it reaches the respective ends of its movement, these switches being connected by a link 41 so that when either switch is opened the other becomes automatically closed. In the circuit arrangement shown, the contacts on the clock mechanism are of sufficient size so that after bridging the corresponding pair of terminals they remain in such contact at least until the traveling nut has reached the opposite end of the stroke.

Tracing the circuits illustrated in Fig. 1, it will be seen that when the switch 39 is closed, this closes the circuit between conductors 42 and 43, the former being connected with one terminal of the generator 38 and with the contact 36, and the latter being connected with one terminal of the motor 31. The switch 40 serves to close the circuit between said terminal of the motor 31 and a conductor 44, which is connected to one contact 37 and to the other terminal of the generator 38. The other members of the pairs of contacts 36 and 37 are connected by a conductor 45 with the other terminal of the motor 31. The lines 43 and 45 lead to the field or armature of the motor 31, other lines, as 48 and 49 lead from the source of current to the armature or field, as the case may be, independently of the clock and contacts. As shown the switches 39 and 40 are alternately operated by the U-shaped bracket 46 carried by and depending from the nut 25.

With the parts arranged as illustrated in Figs. 1 and 2, the nut 25 is at the left hand end of the screw 26 and the member 46 has opened the switch 39. The right hand arms of the members 24 are in depending position and the left hand arms project toward the left. Valve 3 is in open position so that the fuel can flow through the left hand branch 2, while the valve 4 is closed. Valves 15, 16 and 17 establish communication between the fluid pressure pipe 20 and lower portions of the cylinders 5, 6 and 7, so that the respective piston rods are raised for correspondingly moving the valves or parts to which they are connected. The valves 17′, 18 and 19 connect the upper portion of the cylinder 7 and lower portions of the cylinders 8 and 9 with the ports 22 opening into the atmosphere, whereby the pistons of cylinders 7 can move upwardly, while the pistons of cylinders 8 and 9 can move downwardly.

Shortly after the nut comes into the position shown in Fig. 1 the contact 35 will cease to bridge the terminals 37; then after a suitable interval of time has elapsed since it came into that position, one of the switches or bridging members 35′ will be brought by the clock into engagement with the contacts 36, to bridge the gap therebetween. This closes a circuit including the generator 38, conductor 42, contacts 36, conductor 45, motor 31, switch 40 and conductor 44, the switch 40 having previously closed when the switch 39 opened. The motor will now rotate the screw in the direction to cause the nut to travel toward the right. The member 29 is therefore carried under the members 24 in succession, and in contacting with the right hand depending arms of said members 24 will swing them toward the right, the left hand arms being swung downwardly to depending position. This reverses the various actuators 24 in succession and in the embodiment shown reverses one by one after the other the valves 3, 15, 16, 17, 17′, 18, 19 and 4. The valves 3, 15, 16 and 17 which were open, therefore become closed, and the valves 17′, 18, 19 and 4 which were closed become open. The valves 15, 16 and 17 accordingly establish communication between the lower portions of the cylinders 5, 6 and 7 and the atmosphere, permitting the respective pistons to move downwardly. Valve 17′ establishes communication between the pipe 20 and upper portion of the cylinder 7, whereby the respective piston is forced downwardly by pressure fluid, while valves 18 and 19 now establish communication between the pipe 20 and lower portions of the cylinders 8 and 9, whereby their pistons are forcibly raised. Valve 4 is opened to reverse the flow of fuel to the other end of the furnace.

When the nut 25 reaches the end of its movement to the right, the member 46 opens the switch 40, and closes the switch 39. Switch 40 being opened will open the circuit above described, thereby stopping the motor 31, after which the respective switch member 35′ is moved away from the contacts 36.

After another interval of time, the next switch member 35 engages the contacts 37, as seen in Fig. 1, to close the circuit including the generator 38, conductor 42, switch 39 which is now closed, conductor 43, motor 31, conductor 45, contacts 37 and conductor 44. The motor 31 is therefore again rotated. This rotation will be in the same direction if the right and left hand screw structure of Fig. 4 is employed, but in the embodiment of Fig. 1 it is in the opposite direction, as the reversed polarity of current supplied in Fig. 1 indicates. This opposite rotation of the motor rotates the screw 26 in the opposite direction, thereby moving the nut 25 to the left. In this movement the various actuators will be successively engaged and each reversed. In the embodiment shown, this will reverse the various valves and bring them into the position first described. When the nut 25 reaches the end of its movement to the left, it opens the switch 39 and closes the switch 40, the opening of the switch 39 stopping the motor.

It will therefore be seen that the nut 25, when it starts from either direction travels continuously to the other end of its movement and then rests until the time control mchanism establishes an electric connection, when the nut travels to the other end of its movement. The speed of travel will of course depend on the speed of the motor and the gearing and may be varied according to the rapidity with which it is desired to operate the successive devices. The various devices are arranged in the order in which it is desired to have them operate; for instance, in controlling an open hearth or natural gas feed furnace, the valve 3 may control natural gas to one end of the furnace; the valves 15 and 16 the corresponding air supply; the valves 17 and 17′ the stack or flue; the valves 18 and 19 air supply to the other end of the furnace, and finally the valve 4, the natural gas supply to the latter end.

Having thus described my invention, what I claim is:

1. In a device of the character described, the combination, of a series of movable actuating devices, a traveler, mechanism for reciprocating the traveler to cause it to successively engage and move the actuating devices, and means for controlling the reciprocation.

2. In a device of the character described, the combination, of a row of movable actuators, a reciprocating traveler having means for engaging and moving the actuators, means for moving the traveler continuously from either end of its movement to the other, and means for automatically controlling the traveler at either end of its movement.

3. In a device of the character described, the combination of a series of movable actuators, a traveler adapted to successively engage such actuators, a screw for operating the traveler, means for rotating the screw, and means for controlling such rotation.

4. In a device of the character described, the combination of a row of independently movable actuators, a screw parallel with said row, a nut movable on said screw, means carried by the nut for engaging and moving the actuators as the nut travels, and means for rotating the screw.

5. In a device of the character described, the combination of a series of movable actuators, a screw, a nut movable on said screw, means carried by the nut for engaging and moving the actuators as the nut travels, means for rotating the screw in a manner to cause the nut to travel first in one direction and then in the other, and means controlling the rotation of the screw.

6. In a device of the character described, the combination of a row of movable actuators, each adapted to turn about an axis and having two projecting arms, a traveler adapted to engage one arm of each actuator in one direction of movement and move such actuator and engage the other arms of the respective actuators in the other direction of movement and return them to the first position, and means for reciprocating the traveler.

7. In a device of the character described, the combination of a row of actuators, each movable about an axis and provided with a pair of arms at an angle to each other, a traveler, means for guiding it parallel with said row of actuators, said traveler having a device adapted to successively enter the space between the pairs of arms and engage one arm and thereby turn the corresponding actuator, and means for reciprocating the traveler.

8. The combination of a series of actuators arranged in a row and each adapted to turn on its axis and having two arms projecting at an angle to each other, a traveler guided parallel with said row and having a tappet adapted to engage one of such pair of arms of each actuator in one direction of the travel and the other arm of each pair in the other direction of travel, and means for reciprocating the traveler.

9. The combination of a series of actuators arranged in a row and each adapted to turn on its axis and having two arms projecting at an angle to each other, a traveler guided parallel with said row and having a tappet adapted to engage one of such pair of arms of each actuator in one direction of movement of the traveler and the other arm of each pair in the other direction of movement, a rotatable screw parallel with the guiding means, and a nut carried by the traveler engaging the screw.

10. The combination of a series of actuators arranged in a row and each adapted to turn on its axis and having two arms projecting at an angle to each other, a traveler guided parallel with said row and having a tappet adapted to engage one of such pair of arms of each actuator in one direction of movement of the traveler and the other arm of each pair in the other direction of movement, a rotatable screw, a nut carried by the traveler engaging the screw, an electric motor for rotating the screw, switching mechanism operated by the traveler at each end of its movement for changing the electric connections to the motor, and a device for closing such connection.

11. In a device of the character described, the combination of a series of movable actuators, a reciprocating traveler adapted to successively engage and move the various actuators, and means for reciprocating the traveler, and controlling devices engaged by the traveler at either end of its movement for stopping the operative movement of the reciprocating means.

12. In a device of the character described, the combination of a series of actuators, a reciprocating traveler adapted to successively engage and move the various actuators, means for reciprocating the traveler, controlling devices acting at either end of the movement for stopping the operative movement of the reciprocating means, and a device for starting the operation of the reciprocating means.

13. In a device of the character described, the combination of a row of actuators, a reciprocating device adapted to successively engage and operate the actuators, mechanism including an electric motor for reciprocating said device, circuits for said motor, a device for closing the proper circuit to start the motor, and electric switches controlled by the traveler at either end of its reciprocation to open the circuit and stop the motor.

14. In a device of the character described, the combination of a series of actuators arranged in a row and each movable, a pair of guide rods parallel with the row of actuators, a traveler mounted on said guide rods and carrying means for engaging the actuators successively, and means between the guide rods for moving the traveler.

15. In a device of the character described, the combination of a series of actuators arranged in a row and each movable, a pair of guide rods parallel with the row of actuators, a traveler mounted on said guide rods and carrying means for engaging the actuators successively, a nut carried by the traveler, and a screw between the guide rods and parallel therewith which said nut engages.

16. In a device of the character described, the combination of a series of actuators arranged in a row and each movable, a pair of guide rods parallel with the row of actuators, a traveler mounted on said guide rods, and carrying means for engaging the actuators successively, a nut carried by the traveler, a screw between the guide rods and parallel therewith which said nut engages, means for rotating the screw and mechanism engaged by the traveler at each end of its movement for stopping such rotation.

17. In a device of the character described, the combination of movable actuating devices, a traveler having means for successively engaging and moving the actuating devices, mechanism for reciprocating the traveler, and means operated by the traveler at each end of its movement for stopping the operation which drives the traveler.

18. In a device of the character described, the combination of a row of independent actuators, a reciprocating traveler having means for engaging and moving the actuators, means for moving the traveler continuously from either end of its movement to the other including a screw parallel with the actuators for reciprocating the traveler, and means for rotating the screw.

19. In a device of the character described, the combination of a series of movable actuators, a traveler adapted to successively engage such actuators, a screw for moving the traveler, an electric motor for rotating the screw, switches for the electric motor, and means for moving the switches operable by the traveler at the respective ends of its movement.

20. In a device of the character described, the combination of a row of movable actuators, a screw parallel with said row, a nut movable on said screw, means carried by the nut for engaging and moving the actuators as the nut travels, means for rotating the screw, and means operated by the traveler at each end of its movement for stopping the operation which drives the traveler.

21. In a device of the character described, the combination of a row of movable actuators, a screw parallel with said row, a nut movable on said screw, means carried by the nut for engaging and moving the actuators as the nut travels, means for rotating the screw, and means for periodically starting the movement of the nut after it has acted upon the various actuators.

22. In a device of the character described, the combination of a row of movable actuators, each adapted to turn about an axis and having two projecting arms, a traveler adapted to engage one arm of each actuator in one direction of movement and move such actuator, and engage the other arm of the respective actuators in the other direction of movement and return them to the first position, a screw parallel with the actuators for reciprocating the traveler, and means for rotating the screw.

23. In a device of the character described, the combination, of a row of actuators, each movable about an axis and provided with a pair of arms at an angle to each other, a traveler, means for guiding it parallel with said row of actuators, said traveler having a device adapted to successively enter the spaces between the pairs of arms, and engage one arm and thereby turn the corresponding actuator, a screw for moving the traveler, an electric motor for rotating the screw, switches for the electric motor, and means for moving the switches operable by the traveler at the respective ends of its movement.

24. The combination of a series of actuators, arranged in a row and each adapted to turn on its axis and having two arms projecting at an angle to each other, a traveler guided parallel with said row and having a tappet adapted to engage one of such pair of arms of each actuator in one direction of movement of the travel and the other arm of each pair in the other direction of movement, means for reciprocating the traveler, and means for periodically starting the movement of the traveler after it has acted upon the various actuators.

25. The combination of a series of actuators, arranged in a row and each adapted to turn on its axis and having two arms projecting at an angle to each other, a traveler guided parallel with said row and having a tappet adapted to engage one of such pair of arms of each actuator in one direction of movement of the travel and the other arm of each pair in the other direction of movement, a screw for moving the traveler, an electric motor for rotating the screw, switches for the electric motor, and means for moving the switches operable by the traveler at the respective ends of its movement.

26. In a device of the character described, the combination of a series of actuators, a reciprocating traveler, adapted to successively engage and move the various actuators, and means for reciprocating the traveler, and controlling devices engaged by the traveler at either end of its movement for stopping the operative movement of the reciprocating means, and means for periodically starting the movement of the traveler after it has acted upon the various actuators.

27. In a device of the character described, the combination of a series of actuators arranged in a row, and each movable, a pair of guide rods parallel with the row of actuators, a traveler mounted on said guide rods and carrying means for engaging the actuators successively, a nut carried by the traveler, a screw between the guide rods and parallel therewith, which said nut engages, an electric motor for rotating the screw, switches for the electric motor, and means for moving the switches operable by the traveler at the respective ends of its movement.

28. In a device of the character described, the combination of movable actuating devices, a traveler having means for successively engaging and moving the actuating devices, mechanism for reciprocating the traveler, valves controlled by the respective actuators, fluid pressure mechanism controlled by the valves, and mechanism for starting the movement of the traveler.

29. In a device of the character described, the combination, of a row of actuators, a reciprocating traveler having means for engaging and moving the actuators, means for moving the traveler continuously from either end of its movement to the other, and means for automatically controlling a period of rest for the traveler at either end of its movement, valves controlled by the respective actuators, fluid pressure mechanism controlled by the valves, and mechanism for starting the movement of the traveler.

30. In a device of the character described, the combination of a series of movable actuators, a traveler adapted to successively engage such actuators, a screw for operating the traveler, means for rotating the screw, valves controlled by the respective actuators, fluid pressure mechanism controlled by the valves, and mechanism for starting the movement of the traveler.

31. In a device of the character described, the combination of a row of movable actuators, a screw parallel with said row, a nut movable on said screw, means carried by the nut for engaging and moving the actuators as the nut travels, means for rotating the screw, valves controlled by the respective actuators, fluid pressure mechanism controlled by the valves, and mechanism for starting the movement of the traveler.

32. In a device of the character described, the combination of a row of movable actuators, a screw parallel with said row, a nut movable on said screw, means carried by the nut for engaging and moving the actuators as the nut travels, and means for rotating the screw in a manner to cause the nut to travel first in one direction and then in the other, valves controlled by the respective actuators, fluid pressure mechanism controlled by the valves, and mechanism for starting the movement of the traveler.

33. In a device of the character described, the combination of a row of movable actuators, each adapted to turn about an axis and having two projecting arms, a traveler adapted to engage one arm of each actuator in one direction of movement and move such actuator and engage the other arm of the respective actuators in the other direction of movement and return them to the first position, a screw for moving the traveler, an electric motor for rotating the screw, switches for the electric motor, and means for moving the switches operable by the traveler at the respective ends of its movement.

34. In a device of the character described, the combination of a row of actuators, each movable about an axis and provided with a pair of arms at an angle to each other, a traveler, means for guiding it parallel with said row of actuators, said traveler having a device adapted to successively enter the space between the pairs of arms, and engage one arm and thereby turn the corresponding actuator, valves controlled by the respective actuators, fluid pressure mechanism controlled by the valves, and mechanism for starting the movement of the traveler.

35. The combination of a series of actuators arranged in a row and each adapted to turn on its axis and having two arms projecting at an angle to each other, a traveler guided parallel with said row and having a tappet adapted to engage one of such pair of arms of each actuator in one direction of movement of the travel and the other arm of each pair in the other direction of movement, valves controlled by the respective actuators, and fluid pressure mechanism controlled by the valves, mechanism for starting the movement of the traveler, and means for automatically stopping the movement of the traveler at the end of a stroke.

36. In an automatic reverser, in combination, a series of valves, a traveler mounted for reciprocation past the valves, a tappet on the traveler for successively operating the valves, mechanism for reciprocating the traveler, and means controlled by the traveler for operating the reciprocating mechanism.

37. An automatic reverser, comprising a series of fluid pressure valves, a traveler reciprocable past the valves, a tappet on the traveler for successively operating the valves, means for reciprocating the traveler, a member extending from the traveler, and means controlled by the said member for operating the reciprocating means.

38. An automatic reverser, comprising a conduit, a series of fluid pressure valves in the conduit for controlling the fluid pressure supply, a screw actuated traveler reciprocable past the valves, a tappet on the traveler for successively operating the valves, and means controlled by the traveler for operating the screw.

39. An automatic reverser, comprising a series of cylinders, pistons in the cylinders, a fluid pressure supply conduit communicating with the cylinders, valves in the conduit for controlling the fluid pressure supply, a traveler reciprocable past the cylinders, a tappet on the traveler for successively operating the valves, means for reciprocating the traveler, a member depending from the traveler, and means controlled by the depending member for operating the reciprocating means.

40. An automatic reverser, comprising a series of cylinders, pistons in the cylinders, a fluid pressure supply conduit communicating with the cylinders, valves in the conduit for controlling the fluid pressure supply, a traveler reciprocable past the cylinders, a tappet on the traveler for successively operating the valves, means for reciprocating the traveler, a member depending from the traveler, and means controlled by the depending member for operating the reciprocating means.

41. An automatic reverser, comprising a series of cylinders, pistons in the cylinders, a fluid pressure supply conduit communicating with the cylinders, valves in the conduit for controlling the fluid pressure supply, a screw actuated traveler reciprocable past the valves, a tappet on the traveler for successively operating the valves, and means controlled by the traveler for operating the screw.

42. An automatic reverser, comprising a series of cylinders, pistons in the cylinders, a fluid pressure supply conduit communicating with the cylinders, valves in the conduit for controlling the fluid pressure supply, a traveler mounted for reciprocation before the cylinders, a tappet on the traveler for successively operating the valves, mechanism for reciprocating the traveler, means controlled by the traveler for operating the reciprocating mechanism, and means for periodically starting the movement of the traveler after it has acted upon the various valves.

43. An automatic reverser, comprising a series of cylinders, pistons in the cylinders, a fluid pressure supply conduit communicating with the cylinders, valves in the conduit for controlling the fluid pressure supply, a traveler reciprocable before the cylinders, a tappet on the traveler for successively operating the valves, a screw for moving the traveler, an electric motor for rotating the screw, switches for the electric motor, and means for moving the switches operable by the traveler, at the respective ends of its movement.

44. An automatic reverser, comprising a series of cylinders, pistons in the cylinders, a fluid pressure supply conduit communicating with the cylinders, valves in the conduit for controlling the fluid pressure supply, actuators therefor, a screw for moving the traveler, an electric motor for rotating the screw, switches for the electric motor, and means for moving the switches operable by the traveler at the respective ends of its movement, and means for periodically starting the movement of the traveler after it has acted upon the various actuators.

45. In a device of the character described, the combination of a series of actuators arranged in a row and each movable, a pair of guide rods parallel with the row of actuators, a traveler mounted on said guide rods, means carried thereby for engaging the actuators successively, a nut carried by the traveler, and a screw between the guide rods and parallel therewith which said nut engages, means for rotating the screw, and valves controlled by the respective actuators, and fluid pressure mechanism controlled by the valves, mechanism for starting the movement of the traveler, and means for automatically stopping the movement of the traveler at the end of a stroke.

46. The combination of a series of quarter turn valves arranged in a row, operating devices therefor mounted on the stem of each valve and having two engageable members separated by a V-shaped space, a traveler mounted to move parallel with said row and adapted to engage and swing one of said members on each valve in one direction of travel and the other member on each valve in the opposite direction of travel, a driving device for reciprocating the traveler, means for stopping the driving device at each end of the travel, and a device for starting the operation of the driving device.

47. A series of actuators arranged in a row and each having two engageable members at an angle to each other, a traveler mounted to move parallel with said row and adapted to engage and swing one of said members of each actuator in one direction of travel and the other member of each actuator in the opposite direction of travel, a driving device for reciprocating the traveler, means for stopping the driving device at each end of the travel, and a device for starting the operation of the driving device.

48. A series of actuators arranged in a row and each having two engageable members at an angle to each other, a screw parallel with said row, a traveler having an engagement with the screw and adapted to engage and swing one of said members of each actuator in one direction of travel and the other member of each actuator in the opposite direction of travel, means for rotating the screw in a manner to cause the traveler to reciprocate, means for stopping the rotation of the screw at each end of the travel, and a device for starting the rotation of the screw.

49. A series of actuators arranged in a row and each having two engageable members at an angle to each other, a screw parallel with said row, a pair of guides parallel with the screw and respectively on opposite sides thereof, a traveler mounted on said guides and intermediately engaging the screw and adapted to engage and swing one of said members of each actuator in one direction of travel and the other member of each actuator in the opposite direction of travel, means for rotating the screw in a manner to cause the traveler to reciprocate, means for stopping the rotation of the screw at each end of the travel, and a device for starting the rotation of the screw.

50. A series of actuators arranged in a row and each having two engageable members at an angle to each other, a guide parallel with said row, a traveler mounted on said guide and a roller adapted to engage and swing one of said members of each actuator in one direction of travel and the other member of each actuator in the opposite direction of travel, means for causing the traveler to reciprocate, means for stopping the movement of the traveler in each direction, and a device for starting the movement of the traveler.

51. The combination of a plurality of movable actuators adapted to extend in the same direction, a plurality of mechanisms controlled by said actuators and being in mutually reversed condition when the actuators extend in the same direction, a traveler adapted to successively engage the actuators, and means for operating the traveler, whereby the mechanisms are changed in condition while preserving the mutual reversed relationship between them.

52. The combination of a series of valves, movable actuating devices therefor adapted to extend in the same direction and connected to the valves in such manner that some of the valves are open and others are "closed" when the actuators all extend in the same direction, a traveler adapted to successively engage said actuators and change the direction of all of them, whereby when the traveler is operated the valves which were "open" become "closed" and the valves which were "closed" become "open."

53. The combination of a series of valves, movable actuating devices therefor adapted to extend in the same direction and connected to the valves in such manner that some of the valves are "open" and others are "closed" when the actuators all extend in the same direction, a traveler adapted to successively engage said actuators and change the direction of all of them, mechanism for moving the traveler in either direction, mechanism for stopping the movement of the traveler in each direction, and mechanism for restarting the movement of the traveler following each stoppage thereof.

54. The combination of a screw and nut, means for rotating one of such members, a device for controlling such rotation, a traveler operated by the screw and nut, and a series of individually movable devices successively operated by the traveler.

55. The combination of a screw, means for rotating the screw, a device for starting such rotation, automatic means for stopping the rotation, a traveler carrying a nut engaging the screw, and mechanism operated by the traveler.

56. The combination with a set of devices adapted to be operated, of mechanism for effecting such operation, a device for periodically and automatically starting the operation of said mechanism, and intermediately operating means for stopping the operation, whereby the mechanism has a period of rest between successive startings by the device.

57. The combination with a set of devices adapted to be operated, of mechanism for effecting such operation, means for starting the operation of the mechanism mentioned, operated periodically and means for stopping the mechanism immediately succeeding each complete operation thereof, whereby the mechanism has a period of rest materially exceeding its period of operation.

58. The combination with a set of devices adapted to be operated, a driving motor, mechanism driven thereby for operating said devices, a device for successively closing the circuit of said motor, and intermediately operating means for opening the circuit of the motor, whereby there is a period of rest between successive startings.

59. The combination with a set of devices adapted to be operated, mechanism for effecting such operation in a comparatively short space of time, including a rotating screw and a traveling nut, means for starting the rotation of such screw at comparatively distant intervals, and means for stopping the operation of the screw immediately succeeding the completion of the travel of the nut, whereby the mechanism has a period of rest materially exceeding its period of operation.

Signed at Cleveland, Ohio, Sept. 20, 1918.

JOHN HORN.